US011815365B2

(12) United States Patent
Kagan

(10) Patent No.: US 11,815,365 B2
(45) Date of Patent: Nov. 14, 2023

(54) METER HAVING A COMMUNICATION INTERFACE FOR RECEIVING AND INTERFACING WITH A COMMUNICATION DEVICE

(71) Applicant: Electro Industries/Gauge Tech, Westbury, NY (US)

(72) Inventor: Erran Kagan, Great Neck, NY (US)

(73) Assignee: EI ELECTRONICS LLC, Westbury, NY (US)

( * ) Notice: Subject to any disclaimer, the term of this patent is extended or adjusted under 35 U.S.C. 154(b) by 0 days.

(21) Appl. No.: 16/382,916

(22) Filed: Apr. 12, 2019

(65) Prior Publication Data

US 2019/0234760 A1 Aug. 1, 2019

Related U.S. Application Data

(63) Continuation of application No. 13/204,160, filed on Aug. 5, 2011, now Pat. No. 10,260,903, which is a
(Continued)

(51) Int. Cl.
*G01D 4/00* (2006.01)
*G06Q 20/38* (2012.01)

(52) U.S. Cl.
CPC .......... *G01D 4/004* (2013.01); *G06Q 20/3829* (2013.01); *Y02B 90/20* (2013.01); *Y04S 20/30* (2013.01)

(58) Field of Classification Search
CPC ............................ G01D 4/004; G06Q 20/3829
(Continued)

(56) References Cited

U.S. PATENT DOCUMENTS 3,748,654 A * 7/1973 Sutherland ............ G01F 15/063
340/870.02
4,713,609 A 12/1987 Losapio et al.
(Continued)

FOREIGN PATENT DOCUMENTS

WO 9854583 A1 12/1998

OTHER PUBLICATIONS

DX-9100 Extended Digital Controller Technical Manual; Johnson Controls, Inc. Code No. LIT-6364020; Aug. 1996.
(Continued)

*Primary Examiner* — Albert K Wong
(74) *Attorney, Agent, or Firm* — Robinson & Cole LLP

(57) ABSTRACT

A meter is provided having a communication interface for receiving and interfacing with a communication device for transmitting measurement and other data to a central computer station via the communication device. The meter includes a measurement module for obtaining measurement data and a processor having a memory for storing application software for communicating the measurement and other data to the communication interface. The data are then provided to the communication device via the communication interface. The communication device is preferably a plug-and-play PCMCIA-type card or other type of memory card having a processor and a connection port for connecting to a port adaptor of the communication interface for receiving the data via the connection port-port adaptor connection. The communication device further includes communication circuitry for communicating the received data to the central computer station via one or more communications networks according to a communications protocol pre-programmed within the processor.

26 Claims, 2 Drawing Sheets

Related U.S. Application Data continuation of application No. 10/958,456, filed on Oct. 5, 2004, now Pat. No. 7,994,934.

(58) Field of Classification Search
USPC .................................... 340/870.02–870.03
See application file for complete search history.

(56) References Cited

U.S. PATENT DOCUMENTS

| | | | |
|---|---|---|---|
| 4,803,632 A | 2/1989 | Frew et al. | |
| 5,252,967 A | 10/1993 | Brennan et al. | |
| 5,459,459 A | 10/1995 | Lee, Jr. | |
| 5,528,507 A | 6/1996 | McNamara et al. | |
| 5,555,508 A | 9/1996 | Munday et al. | |
| 5,602,744 A * | 2/1997 | Meek | G01D 4/002 |
| | | | 705/412 |
| 5,631,554 A | 5/1997 | Briese et al. | |
| 5,631,843 A | 5/1997 | Munday et al. | |
| 5,680,324 A | 10/1997 | Schweitzer, III et al. | |
| 5,715,390 A | 2/1998 | Hoffman et al. | |
| 5,734,571 A | 3/1998 | Pilz et al. | |
| 5,736,847 A | 4/1998 | Doorn et al. | |
| 5,742,512 A | 4/1998 | Edge et al. | |
| 5,898,387 A | 4/1999 | Davis et al. | |
| 5,963,734 A | 10/1999 | Ackerman et al. | |
| 6,073,169 A * | 6/2000 | Shuey | G01D 4/004 |
| | | | 709/217 |
| 6,181,257 B1 | 1/2001 | Meek et al. | |
| 6,275,168 B1 | 8/2001 | Slater et al. | |
| 6,424,270 B1 | 7/2002 | Ali | |
| 6,459,258 B1 | 10/2002 | Lavoie et al. | |
| 6,486,652 B1 | 11/2002 | Ouellette et al. | |
| 6,504,357 B1 | 1/2003 | Hemminger et al. | |
| 6,538,577 B1 | 3/2003 | Ehrke et al. | |
| 6,591,229 B1 | 7/2003 | Pattinson et al. | |
| 6,735,535 B1 | 5/2004 | Kagan et al. | |
| 6,778,920 B1 | 8/2004 | Balch et al. | |
| 6,784,806 B1 | 8/2004 | Lee, Jr. et al. | |
| 6,813,571 B2 | 11/2004 | Lightbody et al. | |
| 6,825,776 B2 * | 11/2004 | Lightbody | G01R 22/065 |
| | | | 324/76.11 |
| 6,871,150 B2 | 3/2005 | Huber et al. | |
| 6,885,185 B1 | 4/2005 | Makinson et al. | |
| 6,889,271 B1 | 5/2005 | Germer et al. | |
| 6,954,814 B1 | 10/2005 | Leach | |
| 7,009,379 B2 | 3/2006 | Ramirez | |
| 7,245,502 B2 | 7/2007 | Kochis et al. | |
| 7,259,690 B1 * | 8/2007 | Furmidge | G01D 4/006 |
| | | | 340/870.03 |
| 7,994,934 B2 | 8/2011 | Kagan | |
| 10,260,903 B2 * | 4/2019 | Kagan | G01D 4/004 |
| 2002/0039068 A1 | 4/2002 | Holowick | |
| 2002/0161536 A1 | 10/2002 | Suh et al. | |
| 2003/0184448 A1 * | 10/2003 | Kagan | G01D 4/004 |
| | | | 340/870.28 |
| 2004/0004555 A1 | 1/2004 | Martin | |
| 2004/0070517 A1 | 4/2004 | Ehrke et al. | |
| 2004/0084914 A1 | 5/2004 | Karimi et al. | |
| 2004/0140908 A1 * | 7/2004 | Gladwin | G01D 4/00 |
| | | | 340/870.02 |
| 2004/0196159 A1 * | 10/2004 | Brennan | G08C 17/02 |
| | | | 340/870.02 |
| 2005/0060436 A1 * | 3/2005 | Kienhoefer | H04W 4/18 |
| | | | 710/1 |
| 2005/0125361 A1 | 6/2005 | Girsham et al. | |
| 2005/0215244 A1 | 9/2005 | Whitson | |
| 2006/0023853 A1 | 2/2006 | Shelley et al. | |
| 2006/0082468 A1 | 4/2006 | Wang et al. | |
| 2008/0136667 A1 | 6/2008 | Vaswani et al. | |

OTHER PUBLICATIONS http://www.landisgyr.us/Landis-Gyr/Meters/2510-socket-meter.asp; dated Mar. 21, 2005; 16 pages.
PowerLogic Circuit Monitor Series 2000 Reference Manual; Square D Company; Instruction Bulletin No. 3020IM9806; Feb. 1999.
Sezi et al., "New intelligent electronic devices change the structure of power distribution systems", Oct. 1999, Industry Applications Conference, 1999. 34th IAS Meeting Conference Record of the 1999 IEEE, vol. 2, pp. 944-952.

* cited by examiner

METER HAVING A COMMUNICATION INTERFACE FOR RECEIVING AND INTERFACING WITH A COMMUNICATION DEVICE The present application is a continuation application of U.S. application Ser. No. 13/204,160, filed Aug. 5, 2011, now U.S. Pat. No. 10,260,903, which is a continuation application of U.S. application Ser. No. 10/958,456, filed Oct. 5, 2004, now U.S. Pat. No. 7,994,934, the contents of which are hereby incorporated by reference in its entirety.

BACKGROUND OF THE INVENTION

1. Technical Field

The present disclosure relates generally to meters of the type used to measure power usage, fluid flow, etc. In particular, the present disclosure relates to a meter having a communication interface for receiving and interfacing with a communication device.

2. Background of the Related Art

Meters are generally installed by utility companies to measure, for example, the amount of energy used by a customer in order to properly bill the customer for the amount of energy used during a specific time period. The most common method for reading the meter to obtain measurements of power usage, etc. is for an individual to visit the location of the meter, visually make a reading by viewing the meter's electronic display or other type of display, such as a series of dials, etc., and record the viewed measurement. The individual may also opt to use a wireless electronic meter reading device, such as a device is capable for example to communicate with a meter's IrDA port when the device is placed in proximity to the IrDA port and along the line-of-sight of the IrDA port. Another type of wireless electronic meter reading device includes a short-range RF receiver for communicating with a meter's short-range RF transmitter when the device is in proximity to the meter. The obtained measurements are then manually inputted or downloaded to a central computer station for billing and other purposes.

An additional method of reading meters is via a communications infrastructure having one or more communications networks, such as PSTN, cellular network, satellite network, Internet, Ethernet, Intranet, LAN, WAN, and other types of networks, capable of transmitting data according to one or more communications protocols, such as CDMA, TDMA, 3G, Internet protocol, Bluetooth, etc., to the central computer station. Accordingly, such meters are equipped with communication circuitry which includes at least a transmitter and an antenna for wirelessly or non-wirelessly transmitting data to a communications network of the communications infrastructure according to a communications protocol. A segment or portion of the communication circuitry is generally provided to the meter at the time of manufacture in the form of an embedded ASIC chip which also performs other functions of the meter.

As such in prior art meters, the circuitry responsible for providing the meter's remote communication capabilities cannot easily be separated from the circuitry which provides the meter's non-communication capabilities. Hence, if a utility company desires to change from one communication infrastructure to another, and/or switch to another communications network and/or communications protocol, the utility company is generally required to replace every meter in the field with meters having the desired communication capabilities.

For example, if a utility company has installed in a city power usage meters capable of communicating with the central computer station via a cellular network leased from a cellular service provider and operating according to the CDMA communications protocol and then the utility company desires to lease another cellular network from another cellular service provider which operates according to the 3G communications protocol, the utility company would have to replace every power usage meter in the city with power usage meters capable of communicating according to the 3G communications protocol. This is very costly and time consuming.

A need therefore exists for a meter having a communication interface for receiving and interfacing with a communication device for communicating with a central computer station. A need also exists for a method for effectively and inexpensively switching from one communications infrastructure to another, where each communications infrastructure may include different communications networks and/or communications protocols.

SUMMARY OF THE INVENTION

The present disclosure provides a meter having communication capabilities and which overcomes the disadvantages of the prior art. In particular, the present disclosure provides a meter having a communication interface for receiving and interfacing with a communication device for transmitting measurement and other data to a central or remote computer station via the communication device. The meter includes a measurement module for obtaining measurement data and a processor (or ASIC) having a memory for storing application software capable of being executed by the processor for performing various functions of the meter, such as running diagnostic tests, obtaining measurement data, and operating a display.

The application software is also executed for communicating the measurement and other data to the communication interface. The data are then provided to the communication device via the communication interface from where it is transmitted to the central computer station via a communications infrastructure. Preferably, the communication device is powered by the meter via the communication interface. The communication device is equipped with communication circuitry and application software for transmitting the measurement and other data via a communications network according to a communications protocol as known in the art.

The communication device is preferably a plug-and-play PCMCIA-type card or other type of memory card having a processor (or ASIC) and a connection port for connecting to a port adaptor of the communication interface for receiving measurement and other data via the connection port-port adaptor connection. The communication device further includes communication circuitry for communicating the received measurement and other data to the central computer station via one or more communications networks, such as PSTN, cellular network, satellite network, Internet, Ethernet, Intranet, LAN, WAN, etc., of a communications infrastructure according to a communications protocol, such as CDMA, TDMA, 3G, Internet protocol, Bluetooth, etc., pre-programmed within the processor.

The communication device may also be, for example, a cellular phone having a port connector capable of connecting to the communication interface for receiving the measurement and other data via the port connector-communication interface connection and for transmitting the measurement and other data to the central computer station via a CDMA cellular communications network according to the CDMA communications protocol. The communication device may also be, for example, a PDA having a port connector capable of connecting to the communication interface for receiving the measurement and other data via the port connector-communication interface and for transmitting the received measurement and other data to a PSTN, from where it is transmitted through the Internet according to the Internet protocol, and then to another PSTN connected to the central computer station.

The present disclosure further provides a method for effectively and inexpensively switching from a first communications infrastructure to a second communications infrastructure for receiving measurement data at a central or remote computer station from a plurality of meters. Each meter includes a measurement module for obtaining measurement data; and a communication interface configured for receiving the measurement data. The method includes the step of interfacing each of the plurality of meters with a first communication device via the communication interface. The first communication device is adapted to communicate with the central computer station via the first communications infrastructure. The method further includes the step of removing the first communication device from each of the plurality of meters and interfacing each of the plurality of meters with a second communication device via the communication interface. The second communication device is adapted to communicate with the central computer station via the second communications infrastructure.

BRIEF DESCRIPTION OF THE DRAWINGS

Preferred embodiments of the present disclosure are described hereinbelow with reference to the drawings wherein.

DETAILED DESCRIPTION OF THE PREFERRED EMBODIMENTS

Figure 1:
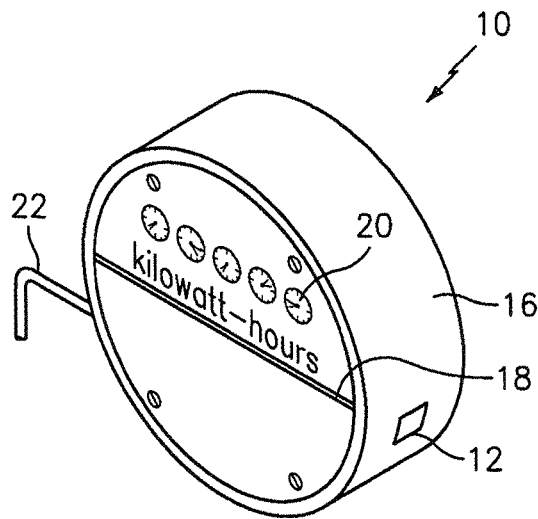
FIG. 1 is a perspective view of a meter having a communication interface for receiving and interfacing with a communication device in accordance with the present disclosure.

Referring now in detail to the drawing figures, in which like references numerals identify similar or identical elements, there is illustrated in FIG. 1 a meter constructed in accordance with a preferred embodiment of the present disclosure and is designated generally by reference numeral 10. Meter 10 is preferably of the type used for measuring power and/or energy use, such as for example, an electric current meter. However, other types of meters, such as, for example, gas, oil, pressure, and water or other fluid measuring meters, are contemplated within the scope of the present disclosure.

With reference to FIGS. 1-4, meter 10 includes a communication interface 12 for receiving and interfacing with a communication device 14 which is located in proximity to meter 10. Communication device 14 transmits the measurement and other data to a central or remote computer station. Meter 10 further includes a glass housing 16; a rotating wheel 18; a series of mechanical dials 20 for displaying, for example, kilowatt-hours (the dials can be replaced by a digital display as known in the art) as measured by a measurement module 50 (see FIG. 5a); and power line 22 for powering meter 10. Measurement module 50 includes circuits, components and devices for measuring power usage, fluid flow, etc. as known in the art.

Figures 2, 3:
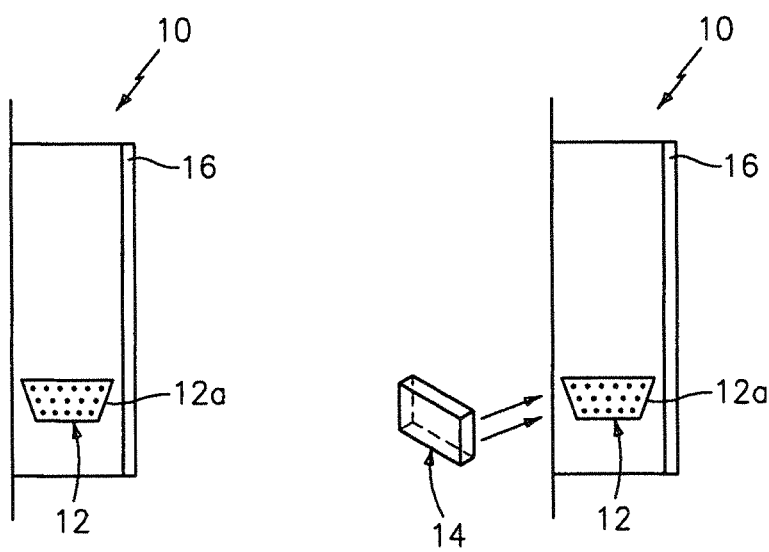
FIG. 2 is an enlarged side view of the meter of FIG. 1 showing the communication interface.
FIG. 3 is an enlarged side view of the meter of FIG. 1 showing a communication device being received by and interfaced with the communication interface.
Figure 4:
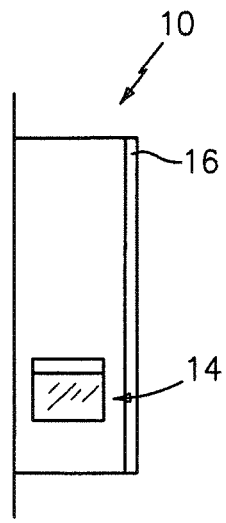
FIG. 4 is an enlarged side view of the meter of FIG. 1 showing the communication device interfaced with the communication interface.
Figure 5A:
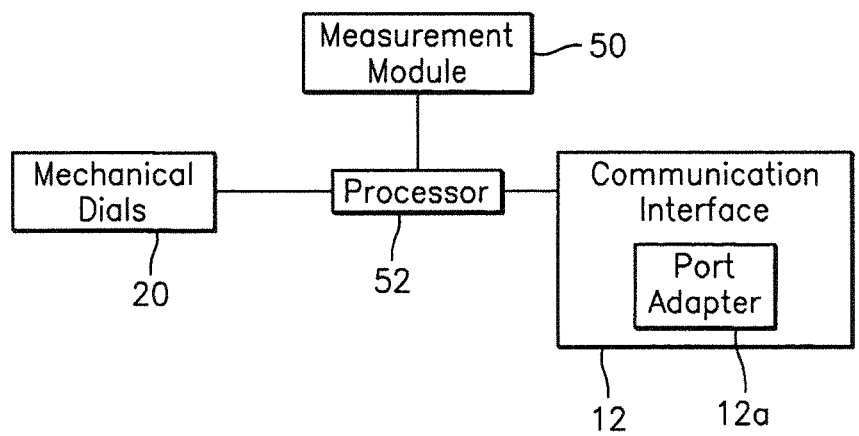
FIGS. 5a and 5b are block diagrams of the meter shown by FIG. 1 and the communication device shown by FIG. 3.

Communication interface 12 includes a port adaptor 12a and communication device 14 includes a connection port 24 for connecting to port adaptor 12a, in order for communication interface 12 to communicate measurement and other data to communication device 14 via the connection port-port adaptor connection as shown by FIG. 4. The connection is preferably achieved via an edge connector scheme as known in the art. Glass housing 16 defines an opening for placement of port adaptor 12a as shown by FIG. 2. The opening enables the communication device 14 to be interfaced with the meter 10 without opening the housing 16 as indicated by the arrows in FIG. 3. Likewise, the communication device 14 may be removed from the housing 16 without opening the housing when replacing the communication device 14 with one of a different communication protocol. Once disposed in the opening of the housing 16 and interfaced with the meter 10, the communication device 14 is accessible externally from the housing 16 as shown in FIG. 4.

Other data transmitted to communication device 14 can include the name and address of the customer, an account number corresponding to the customer, the date and time of transmission of the measurement data, the date and time of the last transmission of the measurement data, the amount to be billed to the customer, etc.

Other data transmitted to communication device 14 can include a security key which is deciphered or decoded by a decoder 61 (see FIG. 5b) of communication device 14. Upon the security key being decoded, a signal is transmitted by a processor 60 (or ASIC) of communication device 14 to a processor 52 (or ASIC) (see FIG. 5a) of meter 10 via communication interface 12. The signal is embedded with the decoded security key. After receiving the signal, processor 52 determines that the signal is embedded with the decoded security key and transmits the measurement data to communication device 14. If decoder 61 of communication device 14 cannot decode the security key, the signal cannot be embedded with the decoded security key and transmitted to processor 52 of meter 10 for enabling the transmission of the measurement data to communication device 14.

Communication device 14 includes communication circuitry 62 (see FIG. 5b) for transmitting the measurement and other data to the central computer station via known methods, such as RF transmission, cellular transmission, satellite transmission, etc. Communication circuitry 62 can also receive data transmitted from the central computer station via known methods, such as RF transmission, cellular transmission, satellite transmission, etc. Communication device 14 can then transmit the received data to meter 10 via communication interface 12.

The data received from the central computer station by communication device 14 and transmitted to meter 10 can include, for example, instructions for meter 10 to perform one or more diagnostic tests and software updates for appending or overwriting application software stored within processor 52 of meter 10. The application software is capable of being executed by processor 52 of meter 10 for performing various functions of meter 10, such as running diagnostic tests, obtaining measurement data, and operating a display.

The application software is also executed by processor 52 for communicating the measurement and other data to communication interface 12 for being routed or transmitted to communication device 14 from where it is transmitted to the central computer station via a communications infrastructure having one or more communications networks, such as PSTN, cellular network, satellite network, Internet, Ethernet, Intranet, LAN, WAN, etc., operating according to one or more communications protocols, such as CDMA, TDMA, 3G, Internet protocol, Bluetooth, etc. Accordingly, communication device 14 includes application software for transmitting the measurement and other data via a communications network of the communications infrastructure according to a communications protocol pre-programmed within processor 60 of communication device 14. The central computer station utilizes the measurement and other data received from a plurality of meters 10 in the field for billing and other purposes as known in the art.

Processor 52 can store the data to be transmitted to the central computer station in a memory, such as SRAM and DRAM, and transmit the data on a periodic basis to the central computer station. As such, processor 52 includes a timer for clocking a predetermined amount of time, for example, 30 days, before transmitting the data to the central computer station. The data can also be transmitted to the central computer station after processor 52 receives a signal from the central computer station to transmit the data.

In a preferred embodiment as shown by the figures, port adaptor 12a is a serial port adapter. However, it is contemplated that a parallel port adapter or other type of port adaptors can be provided to communication interface 12. It is also contemplated that the interfacing between communication interface 12 and communication device 14 in proximity to meter 10 can be achieved via wireless communication means, such as a short range RF link, infrared link utilizing, for example, at least one IrDA port, etc.

Serial port adapter 12a is preferably a 16-pin serial port adapter where pins 1 through 7 are standard IEEE RS232 interface pins; pins 8 through 10 are EEPROM card identifier pins; pins 11 through 13 provide grounding for communication device 14; and pins 14 through 16 provide power to the communication device 14. Communication device 14 is preferably powered by three volts received via pins 14 through 16 when it is interfaced with serial port adapter 12a.

Figure 5B:
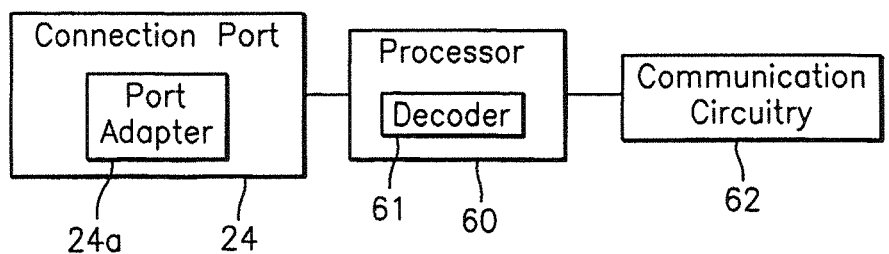

With reference to FIG. 5b, communication device 14 is preferably a plug-and-play PCMCIA-type card 64 or other type of memory card having processor 60 and a serial connection port 24a for connecting to serial port adaptor 12a of communication interface 12. As stated above, processor 60 executes application software stored within a memory for receiving measurement and other data via the connection port-serial port adaptor connection and communicating the received measurement and other data to the central computer station via communication circuitry 62 and via one or more communications networks, such as PSTN, cellular network, satellite network, Internet, Ethernet, Intranet, LAN, WAN, etc., of a communications infrastructure according to a communications protocol, such as CDMA, TDMA, 3G, Internet protocol, Bluetooth, etc., pre-programmed within processor 60.

Processor 60 communicates the measurement and other data to the central computer station via communication circuitry 62 which includes the appropriate hardware, such as, for example, an antenna, RF transmission means (RF transmitter and receiver), modem, telephone jack, Ethernet jack, broadband connection, DSL connection, etc., for transmitting the measurement and other data.

Communication device 14 may also be, for example, a cellular phone having a port connector capable of connecting to communication interface 12 for receiving the measurement and other data via the port connector-communication interface connection and for transmitting the measurement and other data to the central computer station via a CDMA cellular communications network according to the CDMA communications protocol. Communication device 14 may also be, for example, a PDA having a port connector capable of connecting to communication interface 12 for receiving the measurement and other data via the port connector-communication interface and for transmitting the received measurement and other data to a PSTN, from where it is transmitted through the Internet according to the Internet protocol, and then to another PSTN connected to the central computer station.

Hence, in accordance with the present disclosure, an individual or company representative can install a meter equipped with a communication interface 12 which can later be interfaced with a communication device 14 capable of transmitting data over a particular communications network according to a particular communications protocol.

The present disclosure further provides a kit having a meter 10 and a communication device 14. The present disclosure also provides a method for effectively and inexpensively switching from a first communications infrastructure to a second communications infrastructure for receiving measurement data at a central or remote computer station from a plurality of meters 10. Each meter 10 includes a measurement module 50 for obtaining measurement data; and a communication interface 12 configured for receiving the measurement data. The method includes the step of interfacing each of the plurality of meters 10 with a first communication device via the communication interface 12. The first communication device is adapted to communicate with the central computer station via the first communications infrastructure. The method further includes the step of removing the first communication device from each of the plurality of meters 10 and interfacing each of the plurality of meters 10 with a second communication device via the communication interface. The second communication device is adapted to communicate with the central computer station via the second communications infrastructure.

It will be understood that various modifications may be made to the embodiments disclosed herein. Therefore, the above description should not be construed as limiting, but merely as exemplifications of the various embodiments. Those skilled in the art will envision other modifications within the scope and spirit of the claims appended hereto.

What is claimed is:

1. A meter comprising:
   a measurement module for obtaining measurement data; and
   a communication interface configured for receiving the measurement data and for operatively communicating the measurement data to a communication device in proximity to the meter, the communication interface including a port adaptor, the port adapter including at least sixteen pins, wherein pins 1 through 7 are configured to exchange measurement data with the communication device, pins 8 through 10 are configured to read an identifier from the communication device and pins 14 though 16 provide power to the communication device.

2. The meter as in claim 1, wherein the communication device comprising:
   a connection port configured to connect to the port adapter of the meter;
   a processor coupled to the connection port, the processor programmed with at least one communication protocol for converting the measurement data in a predetermined data protocol of the meter to the at least one communication protocol; and
   communication circuitry configured to transmit the measurement data and other data to a remote computing device via the at least one communication protocol over a predetermined communication infrastructure.

3. The meter of claim 1, wherein the communication device is a PCMCIA-type card.

4. The meter of claim 1, wherein the connection port of the communication device comprises an edge connector.

5. The meter of claim 1, wherein the connection port of the communication device comprises one of a serial port adaptor, Ethernet network adaptor, cellular network adaptor and Bluetooth adaptor.

6. The meter of claim 1, wherein communication device further comprises a decoder for decoding a security key received via the connection port from the meter.

7. The meter of claim 1, wherein the communication circuitry of the communication device is configured to transmit the measurement data and other data to the remote computing device via one of RF transmission, cellular transmission and satellite transmission.

8. The meter of claim 1, wherein the communication circuitry of the communication device is adapted for using a wired, wireless, or optical communication link for coupling to the predetermined communication infrastructure.

9. The meter of claim 1, wherein the communication circuitry of the communication device is adapted for coupling to the computing device via one or more communication networks selected from the group consisting of a PSTN, a cellular network, a satellite network, an Ethernet/Intranet/LAN/WAN, and the Internet.

10. The meter of claim 1, wherein the processor of the communication device is adapted for (i) identifying in the information received from the remote computing device portions addressed to the meter and (ii) selectively forwarding the portions to at least one processor of the meter.

11. The meter of claim 10, wherein the portions of the received information comprise requests for pre-determined data or software adapted for execution by the at least one processor of the meter and comprising meter configuration instructions, meter diagnostics instructions, or meter software upgrades.

12. The meter of claim 10, wherein the processor of the communication device is further adapted for:
   identifying in the received information a coded security key;
   decoding the security key; and
   enabling data exchanges between the communication device and the at least one processor of the meter when the decoded security key is a pre-determined security key.

13. The meter of claim 1, wherein the communication circuitry of the communication device further comprises an antenna.

14. The meter of claim 1, wherein the communication circuitry of the communication device further comprises an Ethernet jack.

15. The meter of claim 1, wherein the at least one communication protocol is at least one of a Bluetooth communications protocol, a CDMA communications protocol, a TDMA communications protocol, an Internet protocol and/or a 3G communications protocol.

16. The meter of claim 1, further comprising a housing, wherein the communication interface is accessible externally via an opening in the housing.

17. The meter of claim 1, wherein the measurement module measures at least one of gas usage, oil usage and/or water usage.

18. The meter of claim 1, wherein the measurement module measures parameters of an electrical power line.

19. The meter of claim 1, wherein the communication circuitry of the communication device is configured to transmit the measurement data and other data to the remote computing device via cellular transmission.

20. The meter of claim 19, wherein the communication circuitry of the communication device further comprises an antenna.

21. The meter of claim 16, further comprising a display viewable from an exterior space outside the housing, the display configured to display the obtained measurement data.

22. The meter of claim 21, wherein the display is at least one of mechanical dials and/or a digital display.

23. The meter of claim 16, further comprising at least one processor for operatively communicating other data to the communication device via the communication interface.

24. The meter of claim 23, wherein the other data is at least one of a name and address of a customer associated to the meter, an account number corresponding to the customer, data and time of transmission of then measurement data and/or an amount to be billed to the customer.

25. The meter of claim 1, further comprising at least one processor that stores the measurement data in a memory, the at least one processor operatively communicates the measurement data from the memory to the communication device via the communication interface on a periodic basis.

26. The meter of claim 25, wherein the at least one processor includes a timer that clocks a predetermined amount of time before communicating the measurement data.

* * * * *